(12) United States Patent
Brillhart et al.

(10) Patent No.: US 8,180,519 B2
(45) Date of Patent: May 15, 2012

(54) COOPERATIVE VEHICLE DIAGNOSTICS

(75) Inventors: David C. Brillhart, Orlando, FL (US); Christopher J. Dawson, Arlington, VA (US); Nicholas J. Karels, Aurora, IL (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/202,712

(22) Filed: Sep. 2, 2008

(65) Prior Publication Data

US 2010/0057290 A1 Mar. 4, 2010

(51) Int. Cl.
*G01M 17/00* (2006.01)
(52) U.S. Cl. ............ 701/30.6; 701/29.7; 701/31.7; 700/30; 702/183
(58) Field of Classification Search .......... 701/29–31, 701/33–35; 700/30; 702/183, 184
See application file for complete search history.

(56) References Cited

U.S. PATENT DOCUMENTS

| | | | |
|---|---|---|---|
| 5,218,629 A | 6/1993 | Dumond, Jr. et al. | |
| 6,745,153 B2 * | 6/2004 | White et al. | 702/184 |
| 7,650,211 B2 * | 1/2010 | Wang et al. | 701/34 |
| 7,764,188 B2 * | 7/2010 | O'Neal et al. | 340/679 |
| 2002/0198632 A1 | 12/2002 | Breed et al. | |
| 2005/0221759 A1 | 10/2005 | Spadafora et al. | |
| 2006/0020379 A1 | 1/2006 | Salman et al. | |
| 2006/0184295 A1 * | 8/2006 | Hawkins et al. | 701/33 |
| 2008/0186206 A1 | 8/2008 | Reumerman | |

FOREIGN PATENT DOCUMENTS

WO WO-0126335 12/2001

OTHER PUBLICATIONS

Diao, Xunxing et al., "Experiments on PAVIN Platform for Cooperative Inter-vehicle Communication Protocol (CIVIC)", *IEEE Africon 2009* (Date Obtained from Internet: Feb. 25, 2010) Sep. 2009, pp. 1-7.
Feddema, John et al., "Cooperative Robotic Sentry Vehicles", *Part of the SPIE Conference on Sensor Fusion and Decentralized Control in Robotic Systems II, SPIE* vol. 3839 Sep. 1999, pp. 44-54. Lee, Suk-Bok et al., "Secure Incentives for Commercial Ad Dissemination in Vehicular Networks", *ACM MobiHoc '07* Sep. 2007, pp. 150-159.
Rybicki, Jedrzej et al., "PeerTIS—A Peer-to-Peer Traffic Information System", *VANET '09* Sep. 25, 2009, pp. 23-32.
Wegener, Alex et al., "TraCI: An Interface for Coupling Road Traffic and Network Simulators", *Proceedings of the 11th Communications and Networking Simulation Symposium* 2008, pp. 155-163.

* cited by examiner

*Primary Examiner* — Paul N Dickson
*Assistant Examiner* — Timothy Wilhelm
(74) *Attorney, Agent, or Firm* — DeLizio Gilliam, PLLC

(57) ABSTRACT

Embodiments described herein comprise a system and method for corroborative vehicle diagnostic. The corroborative vehicle diagnostic system allows a vehicle to detect a fault indicator experienced by a vehicle subsystem. The corroborative vehicle diagnostic system allows the vehicle to compare the fault indicator with similar and/or dissimilar conditions experienced by one or more additional vehicle located within a geographic region. A corroborative diagnostic controller compares the fault indicator with the conditions of the additional vehicle. Based on the comparison of the fault indicator with the condition, an error status of the fault indicator is determined. The error status may be that the vehicle subsystem has failed, that the vehicle subsystem has not failed and/or that the results are inconclusive. The corroborative diagnostic controller may communicate directly with a control system of the vehicle.

20 Claims, 5 Drawing Sheets

COOPERATIVE VEHICLE DIAGNOSTICS

BACKGROUND

Embodiments of the inventive subject matter generally relate to the field of vehicle computers, and more particularly, to systems and methods for cooperative vehicle diagnostics.

Modern cars typically have computerized systems capable of detecting failure in various systems of the vehicle. Most vehicles have computer systems which monitor various components of the vehicle. For example, most vehicles monitor the exhaust, the speed of the vehicle and the fuel injection system. When the computer system detects a problem with one of these systems, the computer typically lights an indicator light on the dashboard of the vehicle. The indicator light alerts the operator that there is a problem with the vehicle. The operator can take the vehicle to a certified mechanic in order to repair the vehicle.

SUMMARY

Embodiments of the invention include a method that comprises receiving an indication of a fault indicator experienced by a first vehicle subsystem of a first vehicle. The method may comprise receiving an indication of a condition experienced by a second vehicle subsystem of a second vehicle located proximate to the first vehicle. The method may comprise analyzing the fault indicator by comparing the condition with the fault indicator and determining an error status of the fault indicator based on the analysis. The method may further comprise determining a failure has occurred in the first vehicle subsystem based on the error status.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
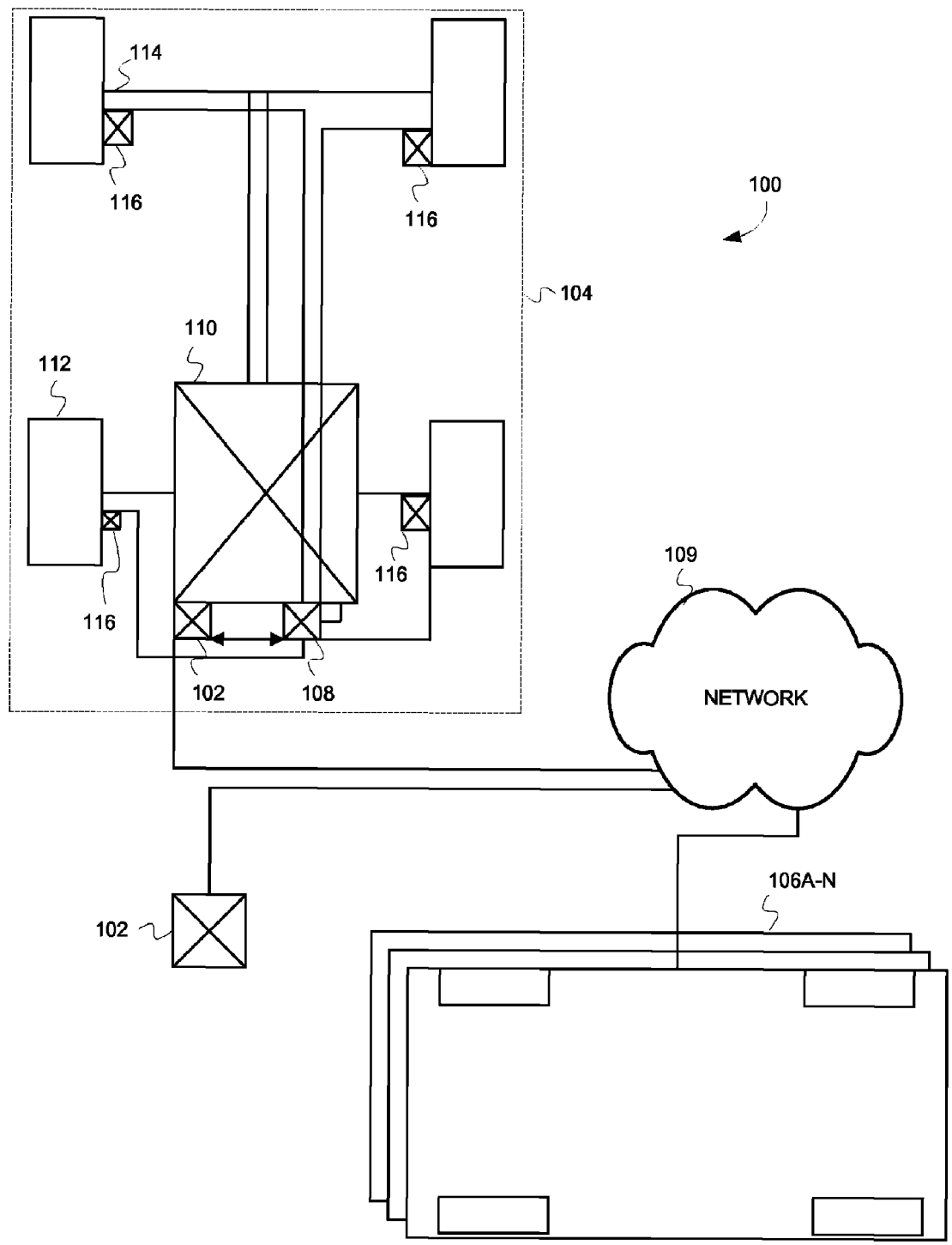
FIG. 1 depicts a block diagram illustrating a vehicle control system configured to corroborate and compare fault indicators and external conditions experienced by multiple vehicles in an embodiment of the invention.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Embodiments described herein comprise a system and method for corroborative vehicle diagnostic. The corroborative vehicle diagnostic system allows a vehicle to detect a fault indicator experienced by a vehicle subsystem. The corroborative vehicle diagnostic system allows the vehicle to compare the fault indicator with similar and/or dissimilar conditions experienced by one or more additional vehicles located within a geographic region. A corroborative diagnostic controller compares the fault indicator with the conditions of the additional vehicle. Based on the comparison of the fault indicator with the condition, an error status of the fault indicator is determined. The error status may be that the vehicle subsystem has failed, that the vehicle subsystem has not failed and/or that the results are inconclusive. The corroborative diagnostic controller may communicate directly with a control system of the vehicle. If the error status is that the vehicle subsystem has failed, an operator of the vehicle may receive a notification of the failure.

In one embodiment, a vehicle subsystem detects a fault indicator. A control system of the vehicle receives notification of the fault indicator. A corroborative diagnostic controller receives notification of the fault indicator. The corroborative diagnostic controller compares the fault indicator with one or more conditions experienced by one or more additional vehicles located within a geographic region. The corroborative diagnostic controller determines whether the fault indicator of the vehicle is similar or dissimilar to the condition experienced by the additional vehicles. If the fault indicator is similar to the condition then the error status indicates that the vehicle subsystem has not failed. If the fault indicator is dissimilar to the condition the error status indicates that the vehicle subsystem has failed. The control system of the vehicle may receive the error status. If the error status is that the vehicle subsystem has failed, the control system may alert the operator of the vehicle subsystem failure.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code stored in the medium. The described embodiments may be provided as a computer program product, or software, that may include a machine-readable storage medium having stored thereon instructions, which may be used to program a computer system (or other electronic device(s)) to perform a process according to embodiments, whether presently described or not, since every conceivable variation is not enumerated herein. A machine readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory, or other types of storage medium suitable for storing electronic instructions.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a vehicle's and/or user's computer, partly on the vehicle's and/or user's computer, as a stand-alone software package, partly on the vehicle's and/or user's computer and partly on a remote computer or entirely on the remote computer or server. In the latter scenario, the remote computer may be connected to the vehicle's and/or user's computer through any type of network, including a local area network (LAN), a personal area network (PAN), or a wide area network (WAN), or the connection may be made to an external computer (for example, through the Internet using an Internet Service Provider).

FIG. 1 depicts a corroborative vehicle diagnostic system 100 according to some embodiments of the invention. The corroborative vehicle diagnostic system 100 includes one or more corroborative diagnostic controllers 102 capable of comparing one or more conditions and one or more fault indicators experienced by multiple vehicles within a geographic location. For exemplary purposes, FIG. 1 shows a first vehicle 104 and a plurality of additional vehicles 106A-N. Each of the vehicles 104 and 106A-N may include the corroborative diagnostic controller 102. Further, the corroborative diagnostic controller 102 may be at a remote location and capable of sending and receiving data from the vehicles 104 and 106A-N. Thus, the corroborative diagnostic controllers can work in a peer-to-peer fashion or in a client-server fashion. Each of the vehicles 104 and 106A-N may have a control system 108 for controlling and monitoring various functions of the vehicles. A communication network 109 may allow communication between the vehicles 104 and 106A-N and/or the corroborative diagnostic controller(s) 102.

The vehicles 104 and 106A-N may be any vehicles capable of traveling on a transit system. The vehicles 104 and 106A-N as shown and described herein are automobiles; however, it should be appreciated that the vehicles may include any suitable vehicle including, but not limited to, a car, a truck, a motorcycle, a scooter, a big rig, a dump truck, a construction vehicle, and the like.

The vehicles 104 and 106A-N include several vehicle subsystems that work together to allow the vehicle to operate. One of the vehicle subsystems is a motor 110, shown schematically. The motor 110 provides power to enable the vehicles 104 and 106A-N to operate. The motor 110 may be any motor capable of providing power to the vehicles including, but not limited to, a combustion engine, an electric motor, a diesel engine, compressed air engine and the like. Other vehicle subsystems, shown schematically in FIG. 1, include the steering and alignment system 112 and a braking subsystem 114. It should be appreciated that each of the vehicles 104 and 106A-N may include any suitable number of vehicle subsystems including, but not limited to a battery subsystem, a cooling system, an air conditioning subsystem, a heater subsystem, a power train subsystem, an exhaust subsystem, an air intake subsystem, a suspension subsystem, a fuel injection subsystem, a tire subsystem and the like.

Each of the vehicle subsystems may include a sensor 116. The sensors 116 monitor the function(s) and operation(s) of the vehicle subsystem they are used in conjunction with. The sensors 116 may be any suitable sensor capable of monitoring the vehicle subsystem including, but not limited to ambient air temperature sensor, ABS speed sensor, ABS wheel sensor, tire slip sensor, wind gauge sensor, battery temperature sensor, brake wear sensor, oxygen sensor, fuel injection temperature sensor, fuel vapor pressure sensor, idle speed sensor, fuel tank sensor, accelerator pedal sensor, brake fluid sensor, air charge temperature sensor, air cleaner temperature sensor, air flow meter/mass air sensor, camshaft position sensor, coolant level sensor, coolant temperature sensor, EGR valve position sensor, fuel level sensor, heater core temperature sensor, knock sensor, MAP-Barometric pressure sensor, pressure sensor, oil level sensor, remote tire pressure sensor, reference mark sensor, transmission temperature sensor, throttle position sensor, turbo pressure sensor, washer fluid level sensor, distributor modulator sensor, suspension sensor, inclination sensor, RPM and load factor sensor, and the like. The sensors 116 detect normal and abnormal operation of the various vehicle subsystems of the vehicles 104 and 106A-N. The sensors 116 send information regarding the operation of the vehicle subsystem to the control system 108 via a communication path 118. The communication path 118 may be any suitable communication path including but not limited to a wire line, an optical line, a wireless interface.

The control system 108 controls the various vehicle subsystems based on the information received from the sensors 116. For example, the control system 108 may receive information that suggests the level of oxygen in the exhaust is insufficient. The control system 108 may then automatically adjust the air to fuel ratio of the combustion process in order to increase the amount of oxygen in the exhaust to an acceptable level. The control system 108 may automatically monitor and adjust the operation of each of the vehicle subsystems during normal operation of the vehicles 104 and 106A-N. In the normal operation of the vehicles 104 and 106A-N, the control system 108 optimizes the operation of the vehicles' various vehicle subsystems based on the data received from the sensors 116.

The control system 108 detects fault indicators as they occur in each of the vehicle subsystems based on the information sent from the sensors 116. The fault indicator is an indication that the particular vehicle subsystem is experiencing an operational state which is outside of the normal operational state of that vehicle subsystem. For example, the fault indicator may be any symptom detected by the sensor 116 that indicates the vehicle subsystem is not operating in a normal state including, but not limited to, the vehicle is at an abnormal inclination relative to the Earth, the steering system is out of alignment, the suspension system has failed, the intake air is contaminated, the exhaust is below emissions standards, and the like. The control system 108 receives the fault indicator and can alert the operator that the vehicle subsystem has failed. However, the fault indicator can be a product of the environment in which the vehicle 104 is operating, and not a true vehicle subsystem failure. Therefore, the corroborative diagnostic controller 102 compares the fault indicator detected by the vehicle 104 with data (e.g., fault indicators, sensor data, etc.) from one or more additional vehicles 106A-N located proximate the vehicle 104.

When the control system 108 of the vehicle 104 detects a fault indicator in a particular vehicle subsystem, the additional vehicles 106A-N (located proximate the vehicle 104) may also detect fault indicators and/or conditions in their corresponding vehicle subsystems. The fault indicators and/or conditions of the additional vehicles 106A-N may show that the vehicles 106A-N are experiencing the same faults as the vehicle 104 or that the vehicles 106A-N are operating normally. Furthermore, the conditions and/or fault indicators may show that the additional vehicles 106A-N have detected completely different fault indicators, failure conditions, or operating states.

The corroborative diagnostic controller 102 receives information regarding the fault indicator experienced by the vehicle 104 and the condition(s) experienced by the additional vehicles 106A-N. The corroborative diagnostic controller 102 compares the fault indicator to the condition(s) in order to determine an error status of the fault indicator. If the condition(s) experienced by the vehicles 106A-N is substantially similar to the fault indicator, the fault indicator may be a result of an external environmental condition experienced by the vehicles 104 and 106A-N. In this event, the error status would indicate no vehicle subsystem failure or a possible error. If the condition(s) experienced by the corresponding vehicle subsystem(s) is dissimilar to the fault indicator, then the fault indicator may be a result of a vehicle subsystem failure. In this event, the error status would be a "hard error", or that the vehicle subsystem had failed.

Figure 2:
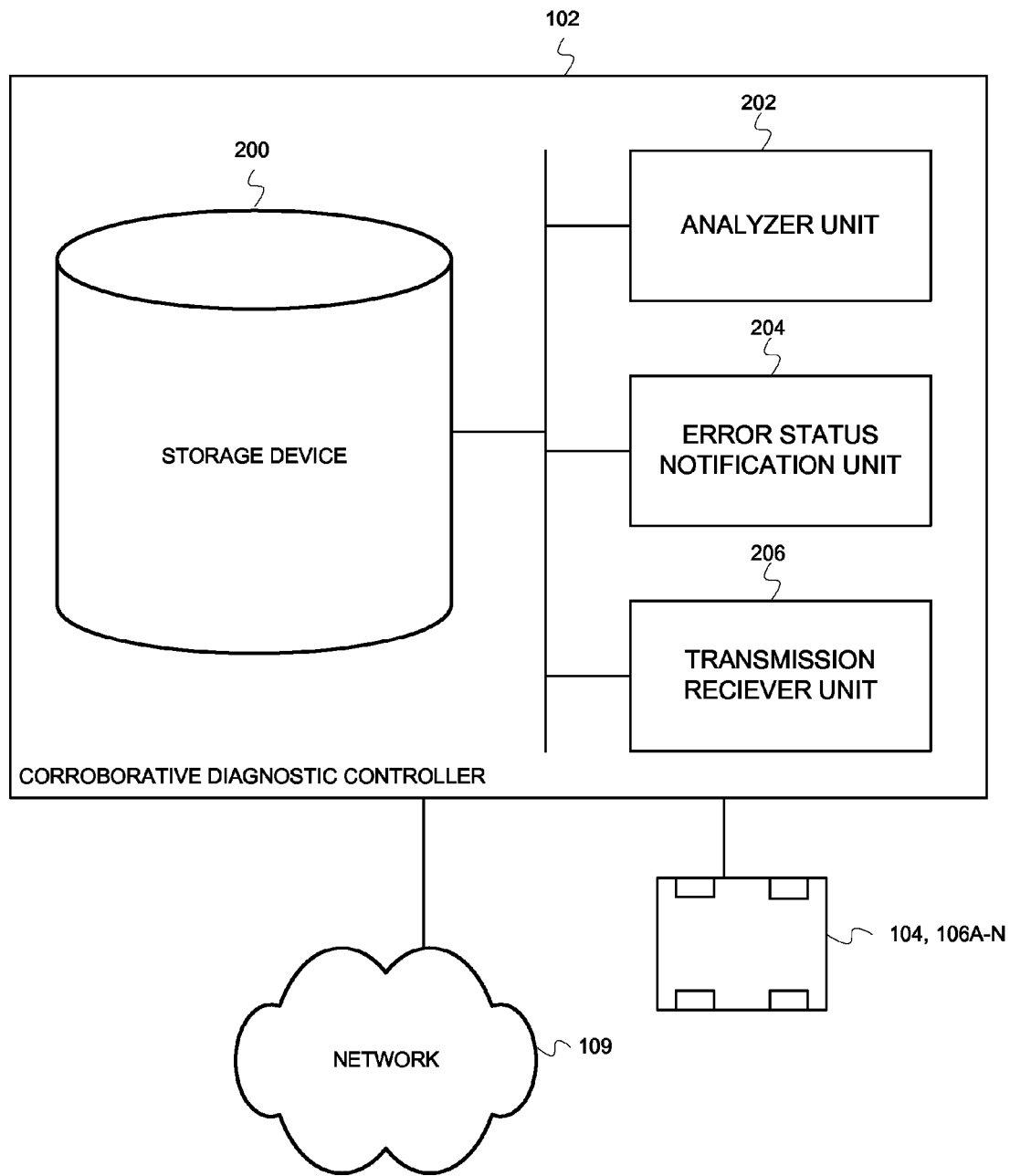
FIG. 2 depicts a block diagram illustrating a corroborative diagnostic controller in an embodiment of the invention.

The corroborative diagnostic controller 102, as shown in FIG. 2, may include a storage device 200, an analyzer unit 202, an error status notification unit 204, and a transceiver unit 206. The analyzer unit 202 compares the fault indicators and the conditions in order to determine the error status of the vehicle subsystem(s). The error status notification unit 204 may assign an error status to a particular vehicle subsystem based on the analysis performed by the analyzer unit 202. The error status notification unit 204 may further relay the error status to the control system 108, 108A-N of one or more of the vehicles 104 and/or 106A-N. The transceiver unit 206 allows the corroborative diagnostic controller 102 to send and receive data from the various components of the corroborative diagnostic system 100. The storage device 200 may store the occurrences of the fault indicators and the conditions experienced by the vehicles 104 and 106A-N, the location where they occurred, and the time and duration in which they occurred.

The analyzer unit 202 may calculate or determine the error status using any number of algorithms and methods. For example, the analyzer unit 202 may determine the error status by calculating a percentage of conditions similar to the fault indicator. If the percentage of the conditions similar to the fault indicator reaches a threshold percentage, for example 80%, then the fault indicator may be logged as an erroneous fault indicator. If the percentage falls below the threshold percentage, the error status may be logged as a subsystem failure. It should be appreciated that any suitable percentage may be used for the threshold percentage. Further, it should be appreciated that the percentage method is only one possible method of determining the error status and that several other methods may be used including, but not limited to, a consensus method, comparing closely related conditions, and the like.

If the analyzer unit 202 determines that a vehicle subsystem failure has occurred, the error status notification unit 204 may alert the control system 108 of the vehicle 104. The control system 108 may alert the operator of the vehicle 104 that the vehicle subsystem has failed by issuing an alert. Further, the control system 108 may alert the operator when the conditions experienced by the additional vehicles 106A-N are similar to the fault indicator. The control system 108 may alert the operator of the condition on the transit system that the vehicles 104 and 106A-N are experiencing. The alert may be any suitable alert, including but not limited to, an indicator light on the dash of the car, an audio notice, a text message on a display in the vehicle, an email to the operator or the manufacturer, a communication to the manufacturer, a text message to a personal digital assistant, and the like. Further, the corroborative diagnostic controller 102 may forgo alerting the control system 108 of the vehicle subsystem failure and relay the information directly to the operator by any method described herein.

The corroborative diagnostic controller 102 may be included in the vehicles 104 and 106A-N at manufacture-time. Further, the corroborative diagnostic controller 102 may be an add-on feature to an existing vehicle.

As noted above, the corroborative diagnostic controllers 102 can operate according to peer-to-peer or client-server models. When operating according to the client-server model, the controllers 102 residing in the vehicles 104 & 106A-N may not include all the components shown in FIG. 2. For example, in-vehicle controllers 102 may not include analyzer units 202 and error status notification units 204. Conversely, one or more land-based corroborative diagnostic controllers 102 can include analyzer units 202 and error status notification units 204.

Figure 3:
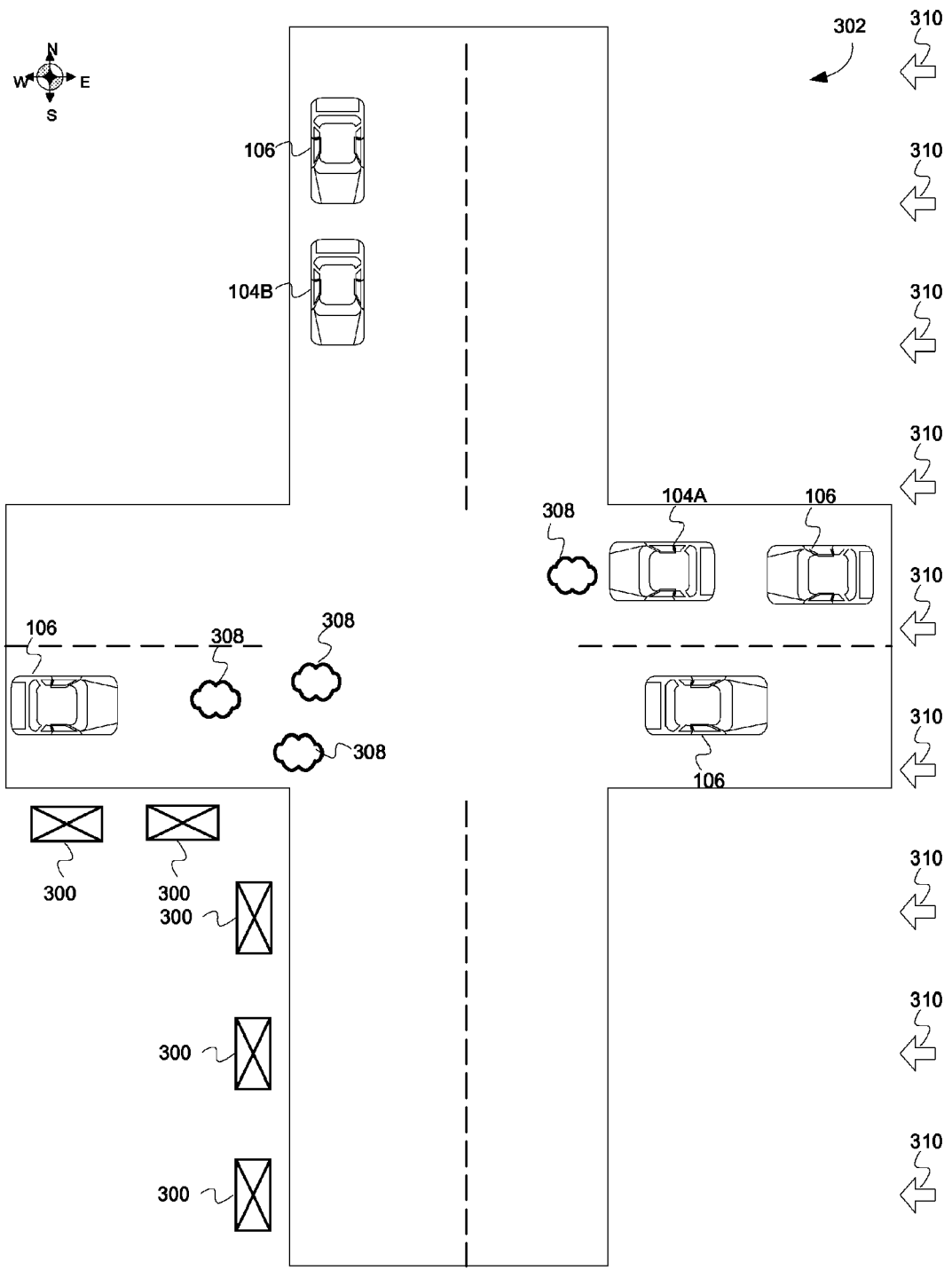
FIG. 3 depicts a schematic diagram of a transit system in an embodiment of the invention.

In some embodiments, a land-based corroborative diagnostic controller 102 may be connected to communication ports 300, as shown in FIG. 3. The communication ports 300 communicate with the corroborative diagnostic controllers 102 and/or control systems 108 of the vehicles 104 and/or 106A-N. The communication ports 300 may be located at intervals along any transit system, or may be at one central location, or a satellite. The communication ports 300 may relay information to the vehicles 104 and 106A-N when the vehicles come into range of the communication port 300, according to some embodiments of the invention. In another embodiment, the communication port 300 may relay information to the vehicles 104 and 106A-N only when a fault indicator is detected in one of the vehicles. Thus, if a fault indicator is detected in the vehicle 104A, the communication port 300 can use the corroborative diagnostic controller 102 to determine the error status of the fault indicator. The communication port 300 may then relay the error status to the vehicle's 104 control system 108 and/or corroborative diagnostic controller 102.

In peer-to-peer and client-server embodiments, the corroborative diagnostic controllers 102 can use the communication ports 300 as a conduit for communications or the controllers 102 may communicate directly.

The communication port(s) 300 and/or the corroborative diagnostic controller(s) 102 may relay information regarding the fault indicators and the conditions experienced to a transit authority. The transit authority may then take appropriate action regarding the condition. For example, the transit authority may post a sign regarding the conditions ahead, and/or fix the transit system.

The corroborative diagnostic controller(s) 102 may save a history record of the time and the location that the conditions and the fault indicators occur. The history record may allow the corroborative diagnostic controller 102 to determine the error status of a fault indicator. For example, if a fault indicator (e.g., shock absorber failure) has been detected at a particular location by several vehicles in the past, the corroborative diagnostic controller 102 may compare past indicators with the fault indicator being experienced in the vehicle 104. The error status may then be determined based on the comparison.

Maintaining the history record may identify repetitive errors in the geographic region. The corroborative diagnostic controller(s) 102 and/or the communication port(s) 300 may relay the history record to the transit authority. The transit authority may then post information regarding that particular location in the transit system in order to alert operators of the conditions in the area. Further, the transit authority may take action at the location, for example fix pot holes.

FIG. 3 illustrates the transit system 302 with multiple vehicles 104A, 104B and 106 traveling along the system. The vehicles 104A, 104B and 106 may detect fault indicator(s) or conditions as they travel along the system. For exemplary purposes, the condition may be one or more potholes 308 and/or a westerly wind 310 as the vehicles travel on the transit system.

The corroborative diagnostic controller 102 may include a location system (not shown). The location system determines the location of the vehicles 104A, 104B and 106 as they travel along the transit system 302. The location system may be a global position system (GPS) according to some embodiments of the invention. Further, the location system may be a GPS used in conjunction with a triangulation method. Further still, the location system may be a triangulation method which uses one or more known locations, for example the communication ports 300. Further, it should be appreciated that the location system may be any suitable system for determining the location of the vehicles as they travel on the transit system 302.

The location system may determine the location where the conditions and/or fault indicators are detected by the vehicles 104A, 104B and 106. For example, when the vehicles 104A and 106 engage the pothole 308 in the west bound lane, the location system may determine the lane the pothole 308 is in. Further, the location system may determine the exact location along the west bound lane. In another, example the location system may determine the length and/or duration that a condition may be experienced. Thus, the vehicles 106 traveling in the eastbound lane experience a plurality of potholes 308 as they travel. The location system may determine the lane the potholes are in and the length along the eastbound lane that the vehicles 106 may experience the condition. The vehicles 104B and 106 traveling in the southbound lane may experience a wind 310. The wind 310 may affect several of the vehicle subsystems, including an inclination sensor and a steering sensor. The location system may determine the location of the wind 310, the duration in length along the transit system, and the time that the wind lasts. The corroborative diagnostic controller(s) 102, and/or the transit authority, may then store condition and fault indicator patterns for the particular locations along the transit system. The particular locations of the stored conditions may assist the corroborative diagnostic controller(s) 102 in determining the error status of the fault indicators.

In operation, the vehicle 104A may detect the fault indicator in a suspension vehicle subsystem when the vehicle 104A engages the pothole 308. The fault indicator may be sent to the corroborative diagnostic controller 102 located in the vehicle 104A, one of the additional vehicles 106. The corroborative diagnostic controller 102 compares the fault indicator with the conditions experienced by the additional vehicles 104B and 106 located in the geographic region. The location system may determine the location of the pothole 308 experienced by the vehicle 104A. The location may be sent to the corroborative diagnostic controller 102. The corroborative diagnostic controller 102 may then compare the fault indicator with conditions experienced by the vehicles 106 traveling in the east-west lanes, or only the westbound lanes. The comparison of the condition and the fault indicator will allow the corroborative diagnostic controller 102 to determine that the fault indicator is the result of a pothole 308 in the westbound lane. Thus, the controller 102 can determine the fault indicator is an error. The controller 102 can relay the error status to the vehicle 104A.

In operation, the vehicle 104B may detect a fault indicator as it travels southbound along the transit system. The fault indicator may indicate that the braking system has a possible failure. The braking fault indicator may be sent to a corroborative diagnostic controller 102 located in the vehicle 104A, one of the additional vehicles 106, and/or the controller connected to the communication port 300. The corroborative diagnostic controller 102 compares the fault indicator with the conditions experienced by the additional vehicles 104B and 106 located in the geographic region. The corroborative diagnostic controller 102 may determine that the other vehicles in the geographic region are not experiencing a similar braking fault indicator or condition. The corroborative diagnostic controller 102 may further compare the braking system fault indicator with a condition experienced by the additional vehicles 106 traveling in the southbound lane. The corroborative diagnostic controller 102 may determine that the additional vehicles 106 traveling in the southbound lane are experiencing a condition of a normal braking system operation. The comparison of the condition and the fault indicator will allow the corroborative diagnostic controller 102 to determine that the fault indicator is the result of the braking subsystem failure of vehicle 104B. The error status is then determined to be a vehicle subsystem failure. The corroborative diagnostic controller 102 can relay the error status to the control system 108 of the vehicle 104B. The error status may then be relayed to the operator of the vehicle 104B.

In another operational example, the vehicles 104A, 104B, and 106 may detect fault indicators and conditions in response to the wind 310. The fault indicator for the vehicle 104B may originate in its steering subsystem. The fault indicator may be sent to the corroborative diagnostic controller 102 located in the vehicle 104B, the vehicle 104A, one of the additional vehicles 106, etc. The corroborative diagnostic controller 102 compares the fault indicator with the conditions experienced by the additional vehicles 104A and 106 located in the geographic region. The corroborative diagnostic controller 102 may determine that the other vehicles in the geographic region are experiencing a similar fault indicator or condition. For example, the vehicles 106 traveling in the southbound lane may be detecting similar steering subsystem failure indicators as a result of the wind 310. Further, the vehicles 104A and 106 traveling in the east/west lanes may experience conditions relating to the load factor of their fuel versus the vehicle performance along the transit system. Thus, the vehicles 106 traveling in the eastbound lane may experience a condition indicating a reduction in performance for the amount of fuel used, while the vehicles 104A and 106 traveling in the westbound lanes may experience a condition indicating an increase in performance for the amount of fuel used. The conditions detected by the west bound and east bound vehicles are consistent with a high wind in one direction and may be compared with the fault indicator in order to determine an error status.

Figure 4:
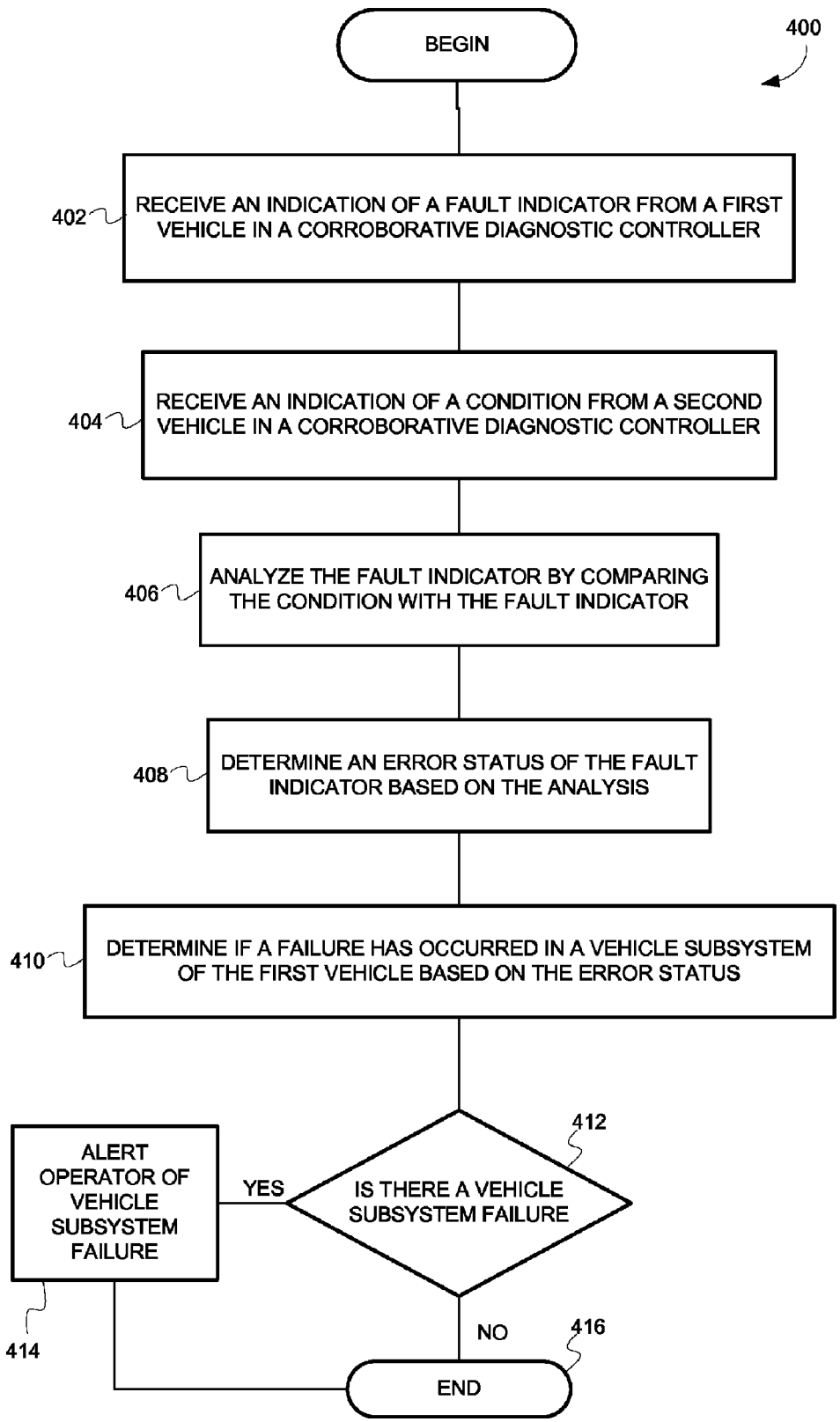
FIG. 4 depicts a flowchart illustrating the operation of the corroborative diagnostic system in an embodiment of the invention.

FIG. 4 is a flow diagram illustrating the operations of the corroborative diagnostic system 100, according to some embodiments of the invention. The flow 400 begins at block 402, where the corroborative diagnostic controller 102 receives a fault indicator from a first vehicle. The flow 400 continues at block 404. At block 404, the corroborative diagnostic controller 102 receives an indication of a condition(s) from a second vehicle. The condition can include one or more fault indicators and sensor data.

The flow continues at block 406, where the corroborative diagnostic controller 102 analyzes the fault indicator by comparing the condition with the fault indicator. The flow continues at block 408, where the corroborative diagnostic system 100 determines the error status of the fault indicator based on the analysis. For example, the error status may be that the vehicle subsystem has failed, that the vehicle subsystem has not failed and/or that the results are inconclusive. The flow continues at block 410, where the corroborative diagnostic system 100 determines if a failure has occurred in the vehicle subsystem based on the error status. If there is a vehicle subsystem failure, the flow continues to block 414 (see block 412). At block 414, the corroborative diagnostic system 100 alerts the operator of the vehicle subsystem failure. For example, the operator receives a visual message on the dashboard of the vehicle indicating a failure. If there is no vehicle subsystem failure, the flow 400 ends at block 416.

Figure 5:
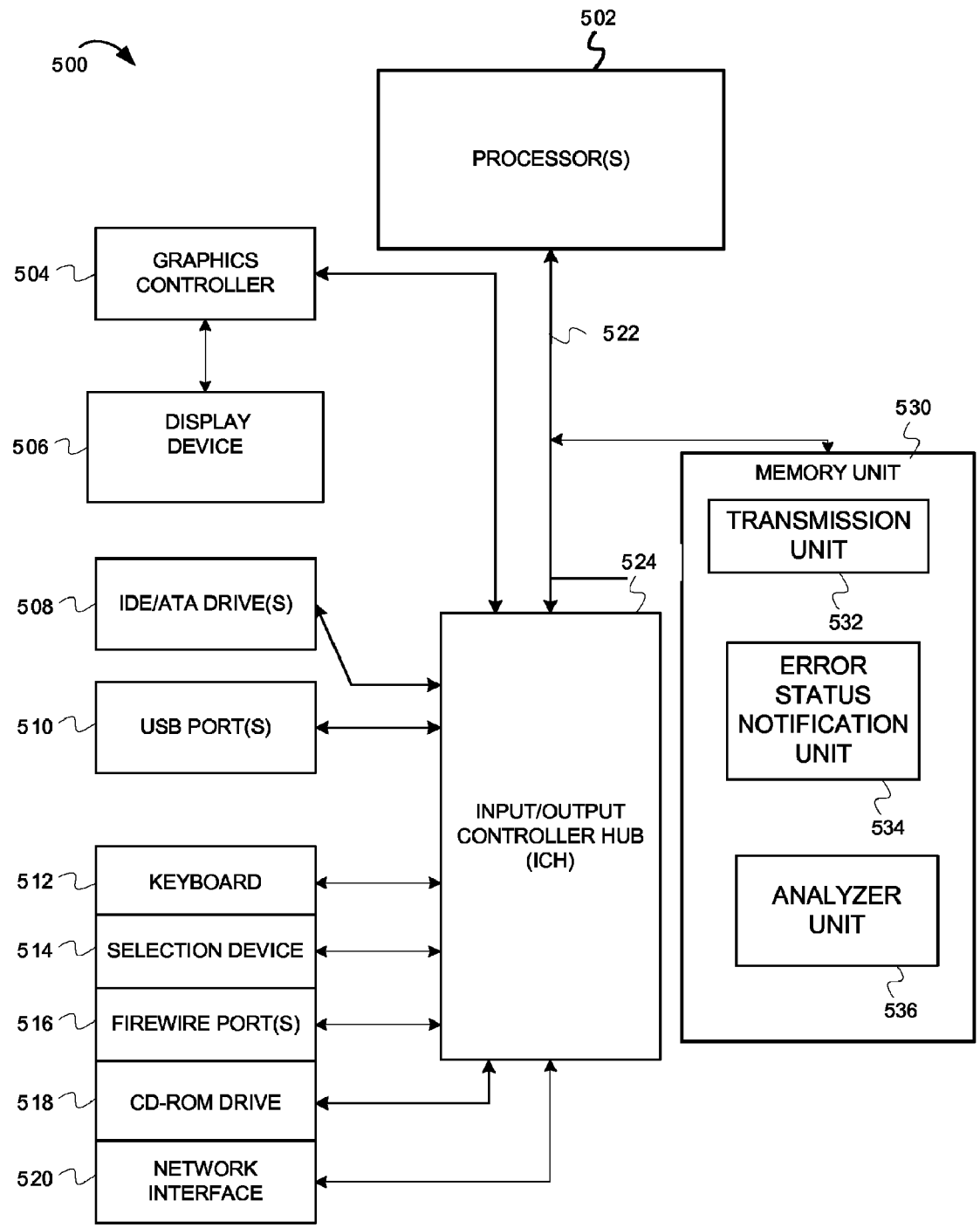
FIG. 5 depicts schematic diagram of a computer system in an embodiment of the invention.

FIG. 5 depicts an example computer system that can embody a diagnostic controller, according to some embodiments of the invention. A computer system 500 includes a processor unit 502 (possibly including multiple processors, multiple cores, multiple nodes, and/or implementing multithreading, etc.). The computer system includes memory 530. The memory 530 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 522 (e.g., PCI, ISA, PCI-Express, HyperTransport®, Infini-Band®, NuBus, etc.), a network interface 520 (e.g, an Ethernet interface, a Frame Relay interface, SONET interface, wireless interface, etc.), and a storage device(s) (e.g., optical storage, magnetic storage, etc.).

The system memory 530 may include a transmission unit 532, error status notification unit 534, and analyzer unit 536 to facilitate the functionality described herein. Some or all of the functionality of the corroborative diagnostic controller may be implemented with code embodied in the system memory 530 and/or processor unit 502. Any one of these functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the storage device(s), and the network interface 520 are coupled to the bus 522. Although illustrated as being coupled to the bus 522, the memory 530 may be coupled to the processor unit 502.

While the embodiments are described with reference to various implementations and exploitations, it will be understood that these embodiments are illustrative and that the scope of the inventive subject matter is not limited to them. In general, techniques for corroborative vehicle diagnostics as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for corroborating faults of vehicle systems, the method comprising:
a computer system receiving a fault indicator detected by a first vehicle subsystem of a first vehicle, wherein the fault indicator indicates a fault in the first vehicle subsystem;
the computer system receiving an indication of a condition detected by a second vehicle subsystem of a second vehicle located proximate to the first vehicle;
the computer system performing an analysis of the fault indicator by comparing the condition with the fault indicator,
the computer system determining an error status of the fault indicator based on the analysis; and
the computer system determining a failure has occurred in the first vehicle subsystem based on the error status.

2. The method of claim 1, wherein performing an analysis of the fault indicator by comparing the condition with the fault indicator further comprises comparing a plurality of conditions detected by a plurality of additional vehicles located proximate the location of the first vehicle.

3. The method of claim 1, wherein determining the error status of the fault indicator based on the analysis further comprises determining that the condition is substantially similar to the fault indicator.

4. The method of claim 3, wherein determining the error status of the fault indicator based on the analysis further comprises determining that the fault indicator was the result of an external environmental condition.

5. The method of claim 4, further comprising the computer system alerting a transit authority of the external environmental condition.

6. The method of claim 1, wherein determining the error status of the fault indicator based on the analysis further comprises determining that the fault indicator was the result of a first vehicle subsystem failure.

7. The method of claim 6, further comprising the computer system alerting an operator of the first vehicle subsystem failure.

8. The method of claim 1, further comprising the computer system reporting a time period in which the first vehicle experiences the fault indicator.

9. The method of claim 8, further comprising the computer system maintaining a history of the fault indicator and conditions detected by a plurality of vehicles proximate a location.

10. The method of claim 9, further comprising the computer system identifying one or more repetitive errors occurring over time near the location.

11. The method of claim 1. further comprising the computer system determining a location at which the fault indicator was detected using a location system.

12. The method of claim 11, further comprising the computer system determining a lane of a highway based on the location.

13. The method of claim 11, further comprising the computer system determining a longitudinal length of the location.

14. A computer program product for corroborating faults of a vehicle system, the computer program product comprising:
one or more computer-readable tangible storage devices;
program instructions, stored on at least one of the one or more storage devices, to perform an analysis of a fault indicator detected by a first vehicle subsystem by comparing the fault indicator with a condition detected by a second vehicle subsystem;
program instructions, stored on at least one of the one or more storage devices, to determine an error status of the fault indicator based on the analysis, wherein the error status indicates a failure has not occurred in the first vehicle subsystem; and program instructions, stored on at least one of the one or more storage devices, to send the error status to the first vehicle.

15. The computer program product of claim 14, wherein the program instructions to determine the error status compare the fault indicator with a plurality of conditions experienced by a plurality of additional vehicles proximate the location.

16. The computer program product of claim 14, further comprising:
program instructions, stored on at least one of the one or more storage devices, to report a time period in which the first vehicle experiences the fault indicator.

17. An apparatus for corroborative diagnostic analysis, the apparatus comprising:
a transceiver unit configured to receive data from a plurality of vehicles;
an analyzer unit configured to compare a fault indicator experienced by a first vehicle subsystem on a first vehicle with a condition experienced by a second vehicle subsystem on a second vehicle and determine an error status of the fault indicator; and
an error status notification unit configured to communicate with the first vehicle and alert an operator of a vehicle subsystem failure if the analyzer unit determines that the fault indicator is not similar to the one or more conditions.

18. The apparatus of claim 17. wherein the corroborative diagnostic controller is located within the first vehicle.

19. The apparatus of claim 17, wherein the corroborative diagnostic controller is in a remote communication port.

20. The apparatus of claim 17, further comprising a plurality of corroborative diagnostic controllers located at intervals along a transit system traveled by the first vehicle.

* * * * *